(12) United States Patent
Kazanchian

(10) Patent No.: US 10,068,196 B2
(45) Date of Patent: Sep. 4, 2018

(54) WIRELESS PACKING SLIP

(71) Applicant: RF Digital Corporation, Hermosa Beach, CA (US)

(72) Inventor: Armen E. Kazanchian, Hermosa Beach, CA (US)

(73) Assignee: RF Digital Corporation, Hermosa Beach, CA (US)

( * ) Notice: Subject to any disclaimer, the term of this patent is extended or adjusted under 35 U.S.C. 154(b) by 451 days.

(21) Appl. No.: 14/835,667

(22) Filed: Aug. 25, 2015

(65) Prior Publication Data
US 2016/0055454 A1    Feb. 25, 2016

Related U.S. Application Data

(60) Provisional application No. 62/041,579, filed on Aug. 25, 2014, provisional application No. 62/041,575, filed on Aug. 25, 2014.

(51) Int. Cl.
*G06Q 10/08*    (2012.01)
(52) U.S. Cl.
CPC ..... *G06Q 10/0833* (2013.01); *G06Q 10/0836* (2013.01); *G06Q 10/08* (2013.01); *G06Q 10/083* (2013.01)

(58) Field of Classification Search
CPC ........... G06Q 10/0833; G06Q 10/0836; G06Q 10/08; G06Q 10/083; G06Q 10/087; G06Q 30/06; G01C 21/34; H04W 4/023; B65G 1/1378
USPC ........................... 340/8.1; 700/232; 705/333
See application file for complete search history.

(56) References Cited

U.S. PATENT DOCUMENTS

| | | | | |
|---|---|---|---|---|
| 9,745,130 | B1* | 8/2017 | Rawal | G06Q 10/0836 |
| 9,830,572 | B2* | 11/2017 | Wan | G06Q 10/0836 |
| 2013/0261792 | A1* | 10/2013 | Gupta | G06Q 10/08 700/232 |
| 2013/0262336 | A1* | 10/2013 | Wan | G06Q 10/0836 705/339 |
| 2015/0227882 | A1* | 8/2015 | Bhatt | G06Q 10/083 705/330 |
| 2016/0026974 | A1* | 1/2016 | Zhao | G06Q 30/02 705/337 |
| 2016/0057270 | A1* | 2/2016 | Kazanchian | H04M 1/72525 455/419 |

* cited by examiner

*Primary Examiner* — Ali Neyzari
(74) *Attorney, Agent, or Firm* — Fish & Richardson P.C.

(57) ABSTRACT

A system for tracking attributes of an object includes a device having a substrate configured to couple to the object. The substrate supports a processor, memory, a first communication interface, and a power source. A node includes a sensor, and a second communication interface operable to communicate data from the sensor to the first communication interface of the device.

12 Claims, 4 Drawing Sheets

WIRELESS PACKING SLIP

PRIORITY

This application claims priority to U.S. application Ser. No. 62/041,579, filed Aug. 25, 2014, and U.S. application Ser. No. 62/041,575, filed Aug. 25, 2014, which are incorporated by reference in their entirety into this application.

BACKGROUND

Identifying and tracking attributes of a package or other shipped product may be desirable. For example, the location in transit is generally identified when the product arrives or leaves certain checkpoints or locations where it is scanned and logged. Other attributes may be relevant to maintain the contents, such as temperature, humidity, time in transit, etc. These attributes are generally tracked by placing separate sensors on the package individually that must be known and read to verify the desired constraints imposed on these attributes. Therefore, traditional solutions for tracking and sensing packages are very expensive and bulky as they require the sensors to be attached to the shipping box itself. This causes them to be very prohibitive for use.

Even if only the location of the package is of interest, the tracking of a package is still generally manually intensive. For example, every package is labeled with a bar code or other identifier. The shipper must then use a handheld scanner at each transit location to identify the package. The scanner must be properly located and oriented relative to the package. The shipper usually manually enters other requested information about the package as well such as time stamps, identity of shipper, location, etc. This process may be overlooked for one or more packages, such that the package may not be reliably tracked throughout its journey.

Tracking location and other desired relevant information for a package generally uses approaches that are very bulky, costly and require professional special instrumentation for use.

SUMMARY

Embodiments described herein may be used as a way to provide wireless communication between a shipping box and a cloud infrastructure, the web or a smartphone. Any of which may also contain environmental information or other attribute about the package during its transport cycle. Attribute information may include, for example, location, temperature, humidity, as well as other data. Embodiments described herein may be used to reduce the prohibitive cost of including sensors in every package that is shipped.

Embodiments described herein may be used to control the data associated with the location and environmental without the substantial cost of sensors on every package. Exemplary embodiments use very low cost devices, which permits them to be disposable and still effective.

DRAWINGS

DESCRIPTION

Figure 1:
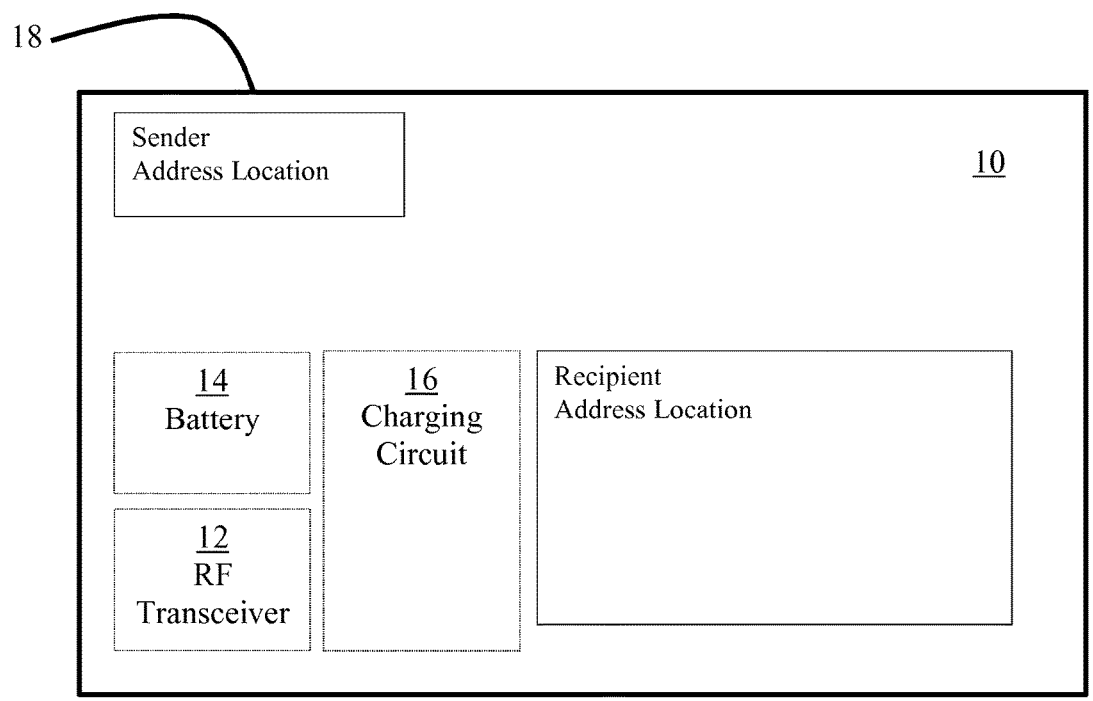
FIG. 1 illustrates an exemplary packing slip according to embodiments described herein.
Figure 2:
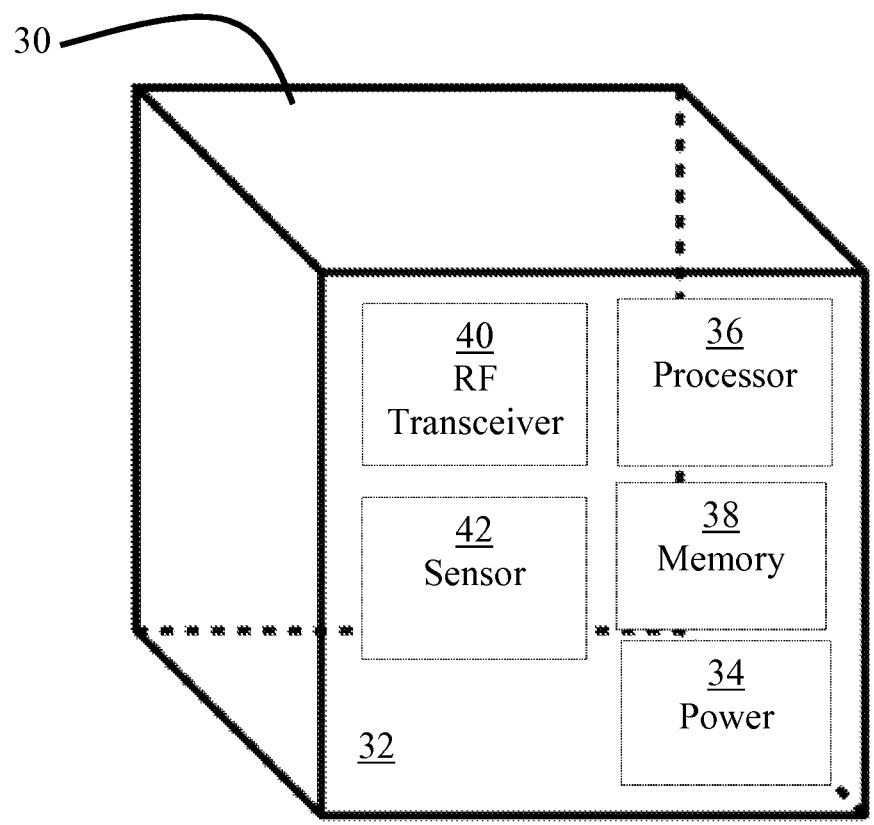
FIG. 2 illustrates an exemplary node according to embodiments described herein.
Figure 3:
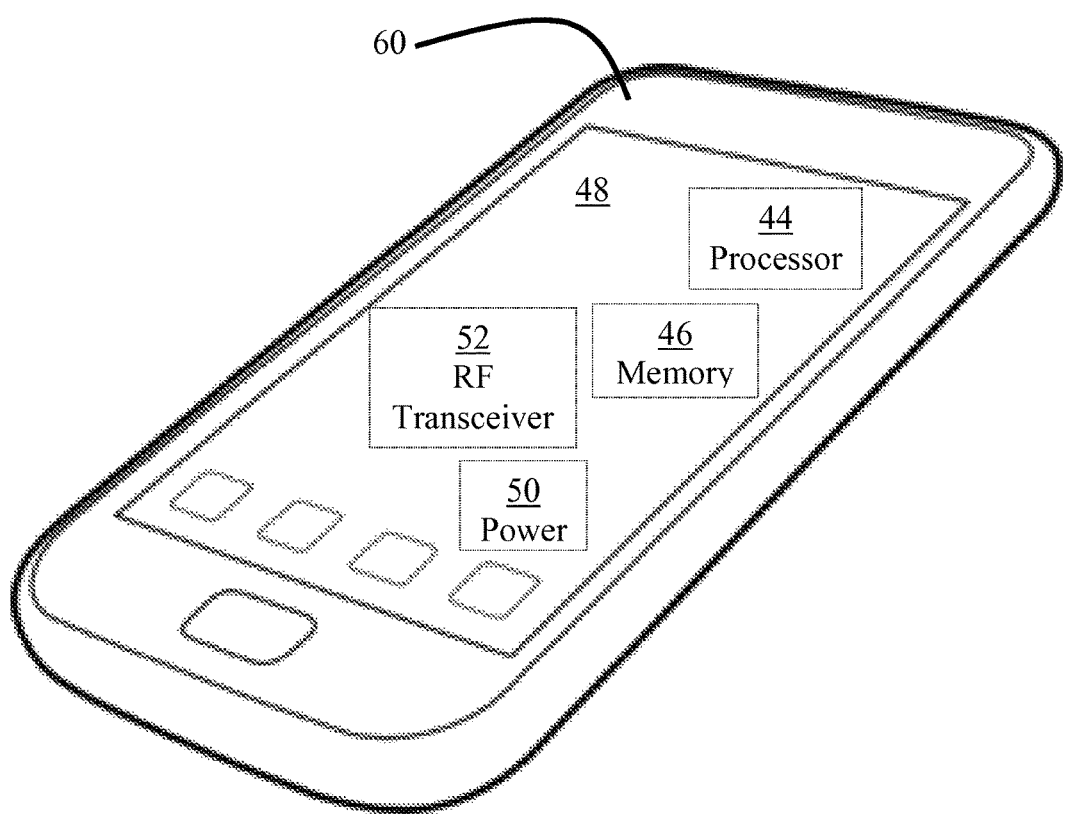
FIG. 3 illustrates an exemplary communication device according to embodiments described herein.
Figure 4:
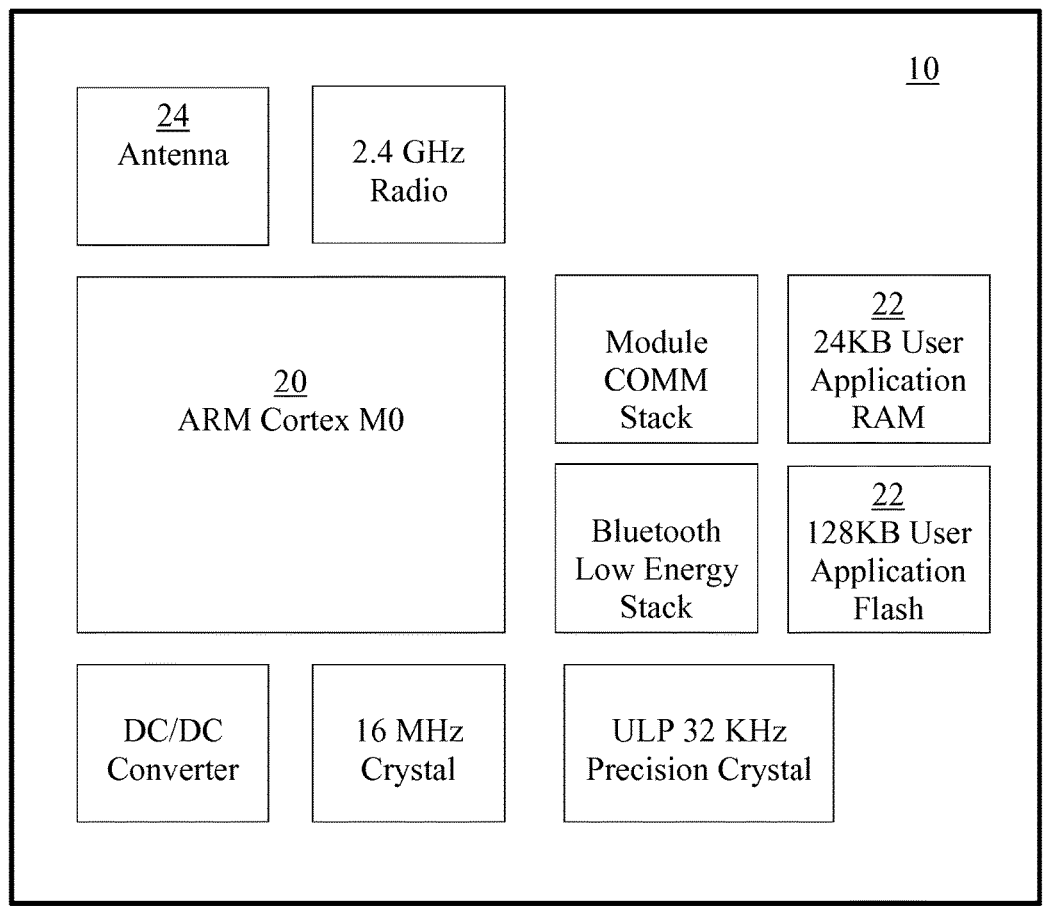
FIG. 4 illustrates an exemplary communication chip that may be integrated into the packing slip, node, or communication device to facilitate communication.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

A wireless RF Electronic Packing Slip 10 for shipping boxes and packages is generally described. Exemplary embodiments contain a wireless RF transceiver 12, rechargeable or non-rechargeable battery 14, and an inductive coupling charger circuit 16 allowing the packing slip to be chargeable without electrical contacts.

In an exemplary embodiment, the slip may comprise a substrate 18 or other base for supporting the associated electronic hardware and software. The substrate may be of any material or form. Preferably, the substrate is lightweight and thin. For example, the substrate may be generally the size of a packing slip or smaller, such as a business card. The substrate may be composed of paper, cardboard, cardstock, plastic, composites, polymers, metals, or any combination thereof. The substrate then supports the hardware and software components to perform one or more functions described herein. For example, the substrate may support a processing unit 20 coupled to a battery 14 and memory 22. The memory stores non-transitory machine readable instructions that, when executed by the processor, perform one or more of the functions described herein. The substrate also supports a wireless communicator such as an RF transceiver 24 that may be controlled by one or more processors 20 and coupled to one or more memories 22. The RF transceiver may send and receive information stored on the memory of the substrate to or from one or more nodes or electronic devices. In an exemplary embodiment, the battery is chargeable and the substrate supports an inductive coupling charging circuit to allow the battery to recharge for extended use and/or reuse of the device. In an exemplary embodiment, components of the slip may be encapsulated inside of a structure, like an overmold or between one or more covers, etc.

Exemplary embodiments of the packing slip include a communication module to facilitate transmission and receipt of instructions and/or data to and/or from the packing slip. The communication module may include a micro size, wireless RF Module that has Ultra Low Power Bluetooth smart-phone connection and also point to multi-point communication. Micro size may be determined by a person of skill in the art based on the physical object to which the RF Module is associated. For example, the RF Module may be micro sized if it is less than 25 mm×25 mm, or approximately 15 mm×15 mm. An exemplary RF Module may be the RFD22301 sold by RF Digital Corporation, which contains a radio transceiver and microprocessor having flash (non-volatile) memory. There is 128 k of user code space available inside of this module, and the user can load their own code (program) aimed at running in the microcontroller itself.

The communication device includes a wireless communicator, which can be one of any dozens of wireless Bluetooth Low Energy devices available in the world. Bluetooth is only exemplary, such as for use as a communication means to smartphones, other types of communication can be used. Although exemplary embodiments described herein use Bluetooth Low Energy to communicate between the packing slip and electronic devices, embodiments are not so limited as the communication devices do not need to use Bluetooth Low Energy. Bluetooth Low Energy is just one of the base protocols that may be use, but is not limited to any one protocol. For example, any wireless protocol can be used such as Bluetooth, Near Field Communication (NFC), WiFi, cellular, etc.

In an exemplary embodiment, the slip may be used in a system including one or more external or disconnected electronic devices 30. The electronic devices 30 may include nodes and/or controllers. Nodes may include one or more electronic devices attached to one or more locations or objects for sending information to the slip. The nodes may provide location, environment, or other information such that the slip may determine one or more attributes about itself or its proximate surroundings. For example, a node may comprise a housing 32 for attachment to a surface. The node may be attached to a warehouse, transport vehicle, dolly, door, etc. The housing may enclose a power source 34, processor 36, memory 38, communication device 40, and one or more sensors 42. The power source may be battery and/or AC depending on the intended location. The communication device may be RF or other interface configured to communicate with the slip. The sensors may detect any characteristic of the node, immediate or proximate environment, or other information of interest. Exemplary sensors may include temperature, humidity, light, acceleration, orientation, location, chemical compositions, etc. The memory may be used to store non-transitory machine readable code for execution by the processor to control the node and/or store information from the one or more sensors or data about the node or of the environment proximate the node.

Exemplary controllers may be electronic devices, such as, for example, mobile smart devices such as phones, tablets, laptops, or dedicated controllers. A controller 60 may comprise a processor 44, memory, display 48, power source 50, and communication interface 52. The controller may be configured to transmit and receive information to or from the slip and/or nodes. The controller may be used, for example, to program the slip and/or nodes or retrieve information therefrom.

In an exemplary embodiment, the system may comprise a slip attached to a package, one or more nodes, and one or more controllers. The slip may be attached to the package directly or indirectly. For example, the slip may comprise an adhesive surface for attachment directly to a package or may be configured to insert into a traditional packaging slip envelope. The slip may be programmed by the controller to select desired program parameters. For example, the slip may be configured or programmed to retrieve identified data continuously, at set intervals, or upon detecting a change. The slip may be programmed to retrieve one or more specific data types from one or more sensors. For example, the slip may be programmed to retrieve and store location, temperature, and humidity, and to record information upon detection from a source or when a source is determined to change. The package and slip may then be shipped. One or more nodes may be positioned along the shipment route, for example, in trucks, on dollies, in warehouses, etc. The nodes may include one or more sensors for sending the specific date types, such as location, temperature, and humidity. The slip may receive the information and save the information to its memory along with a time stamp. The slip may then be configured to transmit the stored information upon detection by a controller or node. Therefore, the progress and condition of the slip may be tracked, stored, and communicated during and/or after transit.

In an exemplary embodiment, the slip may be an identifier that is detected by one or more nodes along the transit route. The slip may include an identifier unique to the shipment such that it may be distinguished from all other slips. The slip may also identify data of interest, such that the slip can transmit to the node which data types should be associated with the slip. The node may also be configured to provide power, such as through induction, to the slip when the slip is in proximity to the node. The slip may send the identifier to the node and identify which data types of interest should be associated with the slip. The node may then be configured to communicate with a remote electronic device identifying the slip and providing the requested information. In this case, the associated information of the slip may be stored external to the slip and communicated to a remote electronic device, controller, or host while the slip is in transit to provide real-time updates on the status of the slip during transportation.

Accordingly, embodiments described herein may be used to automatically track and identify information associated with a package without needing individual and specific sensors located directly on the package itself The information may be stored with the package or may be communicated to an external or remote device during transit. Thus, a delivery person or shipper need not manually scan or track packages through their lifecycle.

The packing slip can be very thin to fit into a standard packing slip pouch outside packages or even inside packages, as radio waves can penetrate through cardboard shipping boxes. It can employ a paper thin battery and very thin electronics. The electronic packing slip can have physical printing outside of the packing slip, which can be removed after use to make the electronics reusable.

In use, the packing slip can communicate to an external electronic device, such as a mobile device, smartphone, tablet, etc. and display real-time or historical information stored in the on-board memory in the packing slip. Embodiments may include a micro size, wireless RF Module that has Ultra Low Power Bluetooth smart-phone connection to facilitate communication. Discrete electronics may also be used instead of a module, as well as non-Bluetooth communication protocols, i.e. such as wireless, telecommunication, near-field communication (NFC), radio frequency (RF), optical, audial, among others.

In an exemplary embodiment, the slip may also detect whether it is affixed to a package, or whether it is separated therefrom. The slip may then be configured to send an alert or warning to the system when detected by a node or controller. In an exemplary embodiment, the attachment and/or detachment of the slip from another object may be recorded in the slip's internal memory. This information can be communicated to a node or controller when within range of external devices of the system. The chance that a slip may be found and reattached to the appropriate package may be improved, as it is likely to occur when the package and slip are still in close proximity to each other. The slip may also provide other warning indications such as light or acoustic to indicate an unintentional separation has occurred simultaneously or in proximity to the event, such that the separation may be remedies and lost packages minimized.

When the electronic packing slip is in range of the external electronic device, such as the smart phone, it can have its continued information retrieved from or written to by the external electronic device or other wireless node that is mobile or stationary.

An exemplary application of this device is when your packages are delivered outside of your house or office; you can use your smart phone from inside of the house to determine what you received and when you received it. Also, tracking numbers and details may be communicated from your smart phone or other smart devices in your home or office to the web for real-time tracking and location tracking.

Located at your home or different locations throughout your office where you might take delivery of a package or that package might be delivered or be transported to, as in the case of it being in a large building shipping department. There can be identifier nodes located all through points which will register the wireless electronic packing slip when they come within range of it, allowing positioning data to be recorded describing and storing data in the packing slip about where it was and when, and also transmitting this data through the remote nodes, back to an infrastructure like an internet cloud service where it can be tracked and used.

This allows indoor GPS like tracking of a package as well as outdoor.

The mounted nodes, can also be located on the delivery trucks as well, inside the truck, as that will allow the electronic packing slips to wirelessly communicate with the stationary mounted nodes inside of the truck. This communication between the packing slips and the fixed location nodes on the trucks allows the packing slips to have their location as being in the truck to be registered and stored in the packing slip and or in the stationary node which can then communicate it to the internet or the driver smart device.

These nodes can be placed on the shipping dolly of the driver (lets say UPS or FedEx or DHL driver) which can be used to register communication between the packing slip and the dolly confirming that the package is actually on the dolly and which dolly it is. Then the dolly node communicates with the smart phone with the driver using the dolly and communicates the data to the internet cloud.

The information can also be stored on the electronic packing slip as well, for retrieval of information without the use of internet infrastructure as there can be direct communication between the electronic packing slip and a smart phone which is used by the recipient of the package.

The sender of the package can store information into that packing slip as well which is encrypted and can only be retrieved by someone who has the password such as customs or the recipient.

That packing slip can also hold information in its onboard memory which relate to dollar amounts of shipping credits or monies reserved for payment of shipping fees and duties etc.

Embodiments described herein include a method of obtaining sensor data from the shipped package without actually having the sensors on the package itself, which adds cost and makes it otherwise prohibitive.

In an exemplary embodiment, sensors are contained at the nodes which are in close proximity to the box which contains the electronic packing slip. The wireless electronic packing slip collects the sensor data wirelessly from the local node on the truck, and does not need a local sensor itself. Therefore, an associated environment or attribute of the package may be locally sensed and tracked with the package without directly requiring individual packages to include the necessary sensors making sensor tracking possible at a very low cost per package.

So if the truck that is transporting the box feels a certain amount of acceleration due to bumps in the road, then all the boxes on the truck feel that as well, and they all wirelessly through this wireless electronic packing slip, collect that sensor data and keep it as a transportation record. Acceleration is just one type of sensor, it can be temperature, humidity, light, gases, sound, anything of interest or relevance to the package and its contents, or any combination thereof.

Also, the GPS location of the truck is known by the node mounted in the truck, so the electronic packing slip acquires that information as well and now knows where it is located and so does the optional infrastructure in the cloud via a cellular modem on the truck.

Multiple nodes can be placed in the truck so it will be reasonably possible to determine the location of the packages in the truck that contains electronic packing slips. Accordingly, delivery personnel may know which side of the truck the package is on, or whether in the front or rear of the truck.

The same nodes, can also be mounted to the doors of the truck and know and report if the door opened or closed for security purposes.

Not always is there infrastructure and web access available to the cloud, so having the ability to locally store data in the memory of the packing slip may be desired and that information can be bi-directionally communicated to and from an electronic device, such as smartphone or tablet, again without internet or even cellular service.

In an exemplary embodiment, a human being can manually enter into the electronic device, information they want to store in the electronic packing slip. The electronic device then interfaces with the hardware and software of the packing slip to program which sensor information to detect and record from the nodes proximate to the packing slip during its transit.

Other data files may also be loaded and stored on the memory of the packing slip. For example, pictures can also be stored in the packing slip. In an exemplary embodiment, a user may use a smart phone or other electronic device to take a digital picture and wirelessly uploaded to the electronic packing slip as it would show the state of the box at a verity of different locations it traveled through until it reaches its destination. In another example, audio messages in different languages can be stored as well and retrieved via infra-structure like the internet via cloud services or locally using a smartphone or other nodes with data input and output devices of all types.

Different security levels can be assigned to specific packages based on user requests with their electronic devices, these can all be encoded and encrypted as well. This would allow those handling it to understand that there is a special handling requirement for that box and treat it accordingly.

Certain stored attributes or memory locations of the packing slip can be open for all to access and read with any electronic device, while other sections of the memory can be just for the carrier to read and other sections which are very secured by password are only for the recipient.

When a package is delivered to your home or office, embodiments disclosed herein may remove the need to knock on your door and have you come to the door and sign. Instead, the smart device within the home or location may be used to sign for packages as you are physically near them and can, on your own smart device press a button to E-sign for them in a group or individually by check boxes to conform or decline. Additionally, this can be done automatically simply by the receiving party being with a re-determined distance of the received package with a packing slip on it and therefore automatically indicating awareness of the package delivered to them. This feature can have multiple levels, such as in the event of packages that have a "signature requested", or no signature required can have different levels of user confirmation of delivery and transfer of responsibility for the package.

The package with the electronic slip may be delivered to a post office or other holding or pick-up facility which has mail boxes, and when a package is placed inside of a mailbox in a post office or in a home or office or other location, a signal may be sent to the local node, which would be relayed to the cloud and notify the owner of the mailbox that they have received a specific package, and even information about its contents.

Exemplary packing slips may be about the size of a business card and very thin so it can easily be placed into a packing slip pouch.

Exemplary embodiments described herein may be reusable or disposal as the cost may be controlled.

In an exemplary embodiment, the electronic packing slip may comprise a printing surface or be shaped and configured to pass through a printer, such that traditional printing information may be incorporated onto a surface of the packing slip. The printing surface may also be located on a sleeve holding the electronic packing slip, such that the sleeve serves as the traditional shipping label or other notification surface, such as to indicate orientation, fragility, or other handling instructions. Once received, the slips can be recyclable by removing the printed surface sleeve which can be printable and re-using the core electronic packing slip, or replaced inside of another printable pouch for continued use.

In an exemplary embodiment, the slip may change its configuration or operating parameters based on information received during transit. For example, when a package is first sent, it may be handled more often as it is packaged, picked up for delivery, etc. However, during transit, the package may wait at holding facilities for longer periods of dormant time. Therefore, in an exemplary embodiment, the associated nodes or states of programmatic activities may be observed by the controller within the packing slip, such that the slip changes its transmission interval to conserve power. The transmission power may also be adjusted such as to conserve power or perform distance determining activities. Therefore, depending on the action of the slip, the information received from a node, pre-programmed activities intervals or settings, or combinations thereof, the slip may change one or more operating parameters, such as power level, transmission interval for sending/receiving instructions, etc. For example, if the slip is on a box that was loaded into an airplane, and the door of the airplane is registered closed, then the remote nodes can inform the slip wirelessly that the slip can slow down its communication interval to a minimal amount, saving power as the flight time will be no less than a communicated duration, so power may be conserved.

Exemplary embodiments described herein may communicate with one or more of the same or other embodiments. For example, an electronic packing slip may communicate with one or more other packing slips to transmit and/or exchange information. Packing slips may also serve as repeaters, relaying information to other packing slips, remote nodes, or controllers, as necessitated by the facility, system, location, or distribution of packages, slips, nodes, or controllers. In an exemplary embodiment, the electronic packing slips may communicate with each other to form a grid, such that the locations of respective and individual packages may be organized and known. This organization may be reported to each other packing slip or remote node for location tracking purposes. For example, by the slips being aware of other packages they are near, it can help with location of slips attached to packages that may easily become lost or overlooked. If a smaller package can be related in reference to its location of a larger package, it may be easier to locate and retrieve for delivery. Alternatively, the information can be historically stored that it was near a larger box, giving an idea of where the package might have gone if misplaced.

The remote node which may contain sensors and other communication devices, such as wifi, cellular, etc, can also be attached to one of many shipping boxes and shipped with a large group of shipments. For example, if the packing slips cost $1 each and you have 20 packages that you are shipping at the same time, you can, on one of the packages also add a node with sensors or perhaps, a node with a cellular or GPS receiver, which will report the sensor information about the one box out of 20. That one node might cost $20 or more, however, its cost is now spread over 20 boxes and therefore the average cost of having those sensors and communication like cellular is average $2 per package which is still affordable and therefore practical for medium value shipment which is the most popular in the world. It is expected that these set of 20 boxes would be near each other through the shipping process as they are going to the same address. This sensor node, with possible cellular in it with GPS optionally, does not have to be a packable device, it can be a shippable device all on its own, only needing an air-bill and include it as the 21st package along with the 20 packages, and would be expected to travel to the destination from the source (sender). This would then be received by the recipient and can be recycled for credit, used by them and kept by them, or with the simple press of a button on the device itself, call for a courier truck to pick it up and ship back to the pre-determined location pre-requested by the sender. These may be portable communication nodes. The portable communication node would have its own battery power and may also harvest energy to recharge the battery.

Exemplary user interface applications for displaying information from the packing slip and/or nodes may be, for example, those described in co-pending application U.S. application Ser. No. 14/834,302, filed Aug. 24, 2015, co-owned by the instant applicant, and incorporated by reference in its entirety into the present application.

A number of exemplary embodiments are described herein including devices for attachment to a package, as well as controllers and nodes for providing information to/from the package during transit. Various features, sensors, components, hardware, software, etc. are described with respect to one or more portions of the system. It is understood that any combination, sub-combination, or re-combination including any duplication or subtraction may be made and be within the scope of the invention. The slip and/or slip may be located elsewhere with respect to the package, such as, for example, inside the package and detected from outside the package.

Similar labels or devices may also benefit from the description herein, and are not intended to be limited to package slips. For example, airbills, routing slips, etc. may also be used in a similar fashion. One or more slips may be used in conjunctions, such as for example, a packing slip attached by a packing department, an airbill attached by a shipping department, a routing slip attached by the recipient shipping department to locally route to a destination, and combinations thereof. Therefore, reference to a shipping slip or slip is not intended to be limiting, but encompasses all such configurations or uses of embodiments described herein.

Exemplary embodiments may be used in other applications as well. Therefore, exemplary embodiments may include a flexible substrate that is configured to transmit and/or receive information to/from a remote device. Either the flexible substrate or the remote device may include a sensor for providing information about the substrate or the remote device, about an object attached to the flexible substrate, or an environment around the sensor. Either the flexible substrate or the remote device may include memory for storing data received from the sensor. The remote device may include a plurality of nodes and/or a controller for displaying and/or configuring the flexible substrate or other nodes. An exemplary application for the flexible substrate having a sensor for sending information to a remote device for display to a user is the health monitoring, as described in U.S. application Ser. No. 62/041,575, and incorporated by reference in its entirety herein.

Embodiments described herein also may use cloud infrastructure. This cloud may be the internet, or it can be a local cloud or small area network which would be cloud like.

What is claimed is:

1. A system for tracking attributes of an object, comprising:
   a device comprising a substrate configured to couple to the object, the substrate supporting a processor, memory, a first communication interface, and a power source; and
   a node comprising a sensor, and a second communication interface operable to communicate data from the sensor to the first communication interface of the device.

2. The system of claim 1, wherein the node is operable to transmit data from the sensor to the device through the first communication interface, and the device is configured to store the transmitted data on the memory.

3. The system of claim 2, further comprising a controller for programming the device to select desired data to receive and store.

4. The system of claim 3, wherein the device is configured to determine whether the transmitted data from the sensor is one of the select desired data, if so, then the transmitted data is stored to the memory, if not, then the transmitted data is not stored to the memory.

5. The system of claim 3, wherein the device is configured to communicate with the controller to transmit stored data from the memory to the controller for communication to a remote location or user.

6. The system of claim 3, wherein the device is configured to communicate with the node to transmit saved data from the memory to the node.

7. The system of claim 6, wherein the node is configured to transmit the transmitted saved data received from the device to a remote location.

8. The system of claim 3, wherein the power source of the substrate is a rechargeable battery and the substrate further supports an inductive circuit for recharging the battery.

9. The system of claim 8, wherein a second power source for charging the battery of the device is supplied by either the node or controller.

10. The system of claim 3, wherein the first communication interface of the substrate is operable for communication by radio frequency (RF).

11. The system of claim 3, wherein the substrate is flexible and configured as a packing slip.

12. The system of claim 11, wherein the packing slip may change one or more operating parameters depending on a present or anticipated action of the packing slip, the information received from the node, pre-programmed activities intervals or settings, or combinations thereof.

* * * * *